United States Patent [19]
Smith, Jr.

[11] 3,864,969
[45] Feb. 11, 1975

[54] STATION MEASUREMENTS OF EARTH FORMATION THERMAL CONDUCTIVITY

[75] Inventor: Harry D. Smith, Jr., Houston, Tex.

[73] Assignee: Texaco Inc., New York, N.Y.

[22] Filed: Aug. 6, 1973

[21] Appl. No.: 386,239

[52] U.S. Cl. ................................................. 73/154
[51] Int. Cl............................................ E21b 47/06
[58] Field of Search .............. 73/154, 151, 15, 15 A

[56] References Cited
UNITED STATES PATENTS
3,807,227   4/1974   Smith, Jr................................ 73/154

*Primary Examiner*—Charles A. Ruehl
*Assistant Examiner*—Marcus S. Rasco
*Attorney, Agent, or Firm*—T. H. Whaley; C. G. Ries

[57] ABSTRACT

An illustrative embodiment of the invention provides two methods for making station measurements of earth formation thermal conductivity. In one method the formation is heated for a predetermined length of time to elevate its temperature. The rate of decay of temperature back to ambient is then measured and used to derive an indication of the thermal conductivity. In the second method the formation is heated by a constant output heat source and its rate of temperature increase is measured and used to derive an indication of the thermal conductivity. These measurements may be used to distinguish hydrocarbon bearing formations from water bearing formations.

3 Claims, 2 Drawing Figures

STATION MEASUREMENTS OF EARTH FORMATION THERMAL CONDUCTIVITY

BACKGROUND OF THE INVENTION

This invention relates to well logging and more specifically to methods of thermal well logging to determine the thermal conductivity and/or specific heat of earth formations in the vicinity of a cased or uncased well borehole.

In cased well bores there are relatively few physical measurements which may be made through the casing to determine the physical properties of formations behind the casing and the cement annulus about the casing. Electrical logging is generally prohibited because the metallic properties of the casing act as an electrical shield on the formation properties which could be measured. Acoustic logging behind casing has been attempted but has generally been unsuccessful primarily because of the large amount of acoustic energy absorbed and transmitted away by the casing. Again as in the electrical measurement case, this masks or obscures the acoustic characteristics of the earth formation behind the casing.

Nuclear well logging techniques, while generally usable in a cased well bore, have frequently encountered difficulty in distinguishing fresh water saturated earth formations from oil or hydrocarbon saturated earth formations. Some nuclear well logging techniques require that the salinity of the formation waters be relatively high (greater than about 40,000 parts per million sodium chloride) in order to detect water and distinguish it from oil in the pore spaces of the earth formations. Other nuclear logging techniques not based on salinity are affected by changes in the formation matrix type. Moreover, nuclear well logging techniques generally require complex and delicate downhole instrumentation. In addition to these shortcomings, most nuclear well logging instruments present at least some form of radiation hazard to personnel.

More thermal well logging has heretofore been conducted primarily in the form of simple temperature measurements taken in a borehole. It has been known in the past, for example, to measure the temperature at various depths in a borehole using a well logging tool having either one or two high resolution thermometers in order to determine the geothermal temperature gradient. This geothermal temperature gradient is a characteristic of well bores wherein the temperature increases at a more or less uniform rate in proportion to the depth of the borehole. Well logs of the well bore temperature alone or of the differential temperature over a relatively short axially spaced distance have been produced. Anomalies in such logs such as sudden slope changes in the geothermal temperature gradient have been used to detect leaks in casing or production tubing or to locate the fluid flow behind the casing in a cased well bore. Such thermal measurements have also been utilized in the past to locate fluid entries into the well bore from perforated or separated casing sections or to define the lowest depth of production or point of entry of liquid injection in a well. In addition to the above uses these techniques have also been utilized to locate the cement top in a cased well bore.

In the prior art temperature logging techniques, generally no heat source has been utilized in the well bore to provide a heat flow from a well logging tool into surrounding earth formations. In the present invention the use of a constant output heat source enables the thermal conductivity, in some cases together with specific heat, characteristics of earth formations in the vicinity of a well borehole to be measured in either open or cased well bores. Moreover, prior art techniques which have been derived from simple temperature measurements in the borehole may also be utilized in the technique of the present invention as a measurement of the ambient borehole temperature is readily available. The present invention provides a method of detecting the difference between fresh water (or salt water) and hydrocarbons behind the casing in a cased well bore. This can provide a basis for determining whether a given earth formation contains fresh water, salt water, or hydrocarbon in the pore spaces therein.

Accordingly, it is an object of the present invention to provide methods for accurately determining the thermal conductivity (possibly in combination with the specific heat) of earth formations in the vicinity of a well bore.

Another object of the present invention is to provide a relatively simple and economical well logging technique for distinguishing fresh water filled earth formation from hydrocarbon filled earth formations in cased and uncased boreholes which is substantially independent of formation lithology.

BRIEF DESCRIPTION OF THE INVENTION

The above and other objects and advantages of the present invention are provided by methods of thermal borehole logging utilizing a well logging sonde making stationery measurements which sonde includes a constant output heat source and a temperature sensor capable of accurate borehole determinations. The well logging tool (which is urged against the borehole or casing wall by a backup arm) is positioned against the borehole wall in the vicinity of an earth formation whose thermal conductivity and/or specific heat is desired to be known. An initial ambient borehole temperature measurement is made and signals representative thereof transmitted to surface equipment. The constant output heat source is then turned on for a predetermined time interval (or until the formation temperature has reached a predetermined level) and the temperature sensor in one embodiment measures the increase of the formation temperature due to the output from the heat source. This temperature increase may then be utilized in a predetermined relationship to measure the thermal conductivity and specific heat of the earth formation. In a second embodiment the temperature sensor may be situated a spaced distance along the body of the well tool from the constant output heat source. In this case the tool is, after the heating has taken place, moved vertically upward in the borehole a distance sufficient to place the temperature sensor opposite the heated earth formation and the decrease in temperature over a predetermined time interval is measured by the temperature sensor. Signals representative of this change in temperature are transmitted to the surface and again may be utilized in predetermined relationships to determine the thermal conductivity (possibly in combination with specific heat) of the formation.

The present invention is described with particularity in the appended claims. The invention is best understood by taking the following detailed description

DESCRIPTION OF THE PREFERRED EMBODIMENTS

Figure 1:
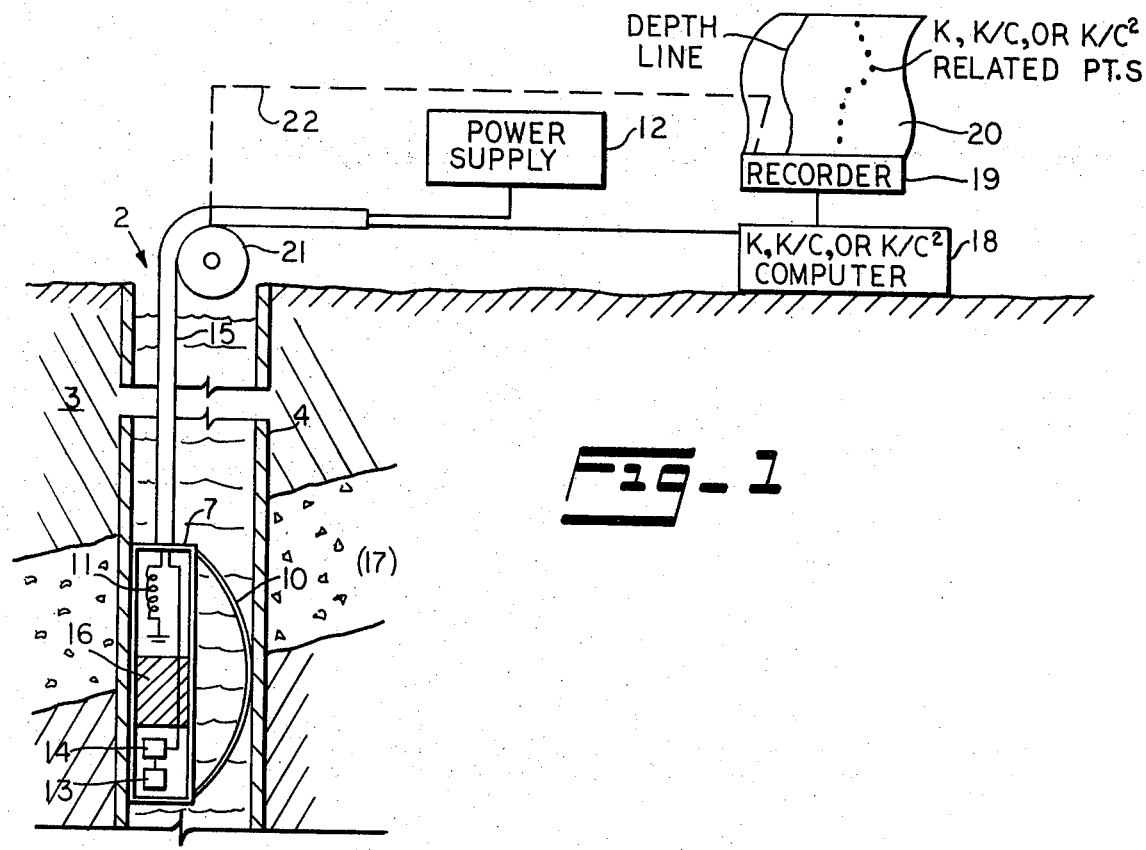
FIG. 1 is a schematic diagram showing a first embodiment of a method according to the present invention being utilized in the borehole well logging system to measure the thermal conductivity and/or specific heat of earth formations.

Physically measurable quantities in either a cased or uncased borehole are the thermal conductivity (K) and the specific heat (C) of the formation matrix and fluid. Measurement of these parameters constitute the basis of the well logging techniques of the present invention. In a borehole environment the rise in temperature ($\Delta T$) is related to the radiated energy (Q) from a heat source, the mass of the heated earth formation (M) and its composite specific heat (C) as given by the relationship of the Equation (1):

$$Q = C \cdot M \cdot \Delta T \tag{1}$$

Table I which follows gives the specific heats of some typical formations and fluids which may be encountered in a borehole. Note the differences between hydrocarbons and salt or fresh water.

TABLE I

| Material | Specific Heat | Material | Specific Heat |
| --- | --- | --- | --- |
| Cement | 0.20 cal/g. °C | Fresh Water | 1.00 cal/g. °C |
| Chalk | 0.21 cal/g. °C | (50K PPM NaCl) Salt Water | 0.93 cal/g. °C |
| Clay(Ory) | 0.22 cal/g. °C | Petroleum | 0.51 cal/g. °C |
| Granite | 0.19 cal/g. °C | M-Octane | 0.58 cal/g. °C |
| Marble | 0.21 cal/g. °C | Methane (Gas) | 0.59 cal/g. °C |
| Quartz | 0.19 cal/g. °C | | |

Similarly, the thermal conductivity (K) of various formations is proportional to the time rate of heat transfer to the formation.

Table II which follows gives measured thermal conductivity K of several typical oil and water saturated formations. Note the difference between hydrocarbon and water saturated formations.

TABLE II

| Material | Porosity | Measured (K) Thermal Conductivity |
| --- | --- | --- |
| Fresh Water Saturated Sand | 34% | 1.775 BTU/Ft · °F · Hr |
| Oil Saturated Sand | 34% | 0.950 BTU/Ft · °F · Hr |
| Air (Gas) Saturated Sand | 34% | 0.322 BTU/Ft · °F · Hr |
| Fresh Water Saturated Limestone | 19% | 2.050 BTU/Ft · °F · Hr |
| Oil Saturated Limestone | 19% | 1.245 BTU/Ft · °F · Hr |
| Air (Gas) Saturated Limestone | 19% | 0.983 BTU/Ft · °F · Hr |
| Air (Gas) Saturated Shale | 7% | 0.603 BTU/Ft · °F · Hr |
| Fresh Water Saturated Sand | 7% | 0.975 BTU/Ft · °F · Hr |
| Fresh Water Saturated Sand | 19.6% | 1.592 BTU/Ft · °F · Hr |
| Oil Saturated Sand | 19.6% | 0.787 BTU/Ft · °F · Hr |
| Air (Gas) Saturated Sand | 19.6% | 0.507 BTU/Ft · °F · Hr |

The one dimensional relationship governing the energy ($\Delta q$) transfer during a short time ($\Delta t$) in an earth formation having a temperature differential ($\Delta \tau$) over a length ($\Delta X$) is given by Equation (2):

$$\Delta q / \Delta t = \alpha K \Delta \tau / \Delta x \tag{2}$$

Where $\alpha$ is a constant dependent on the geometry of the borehole, the formation, and the well logging tool.

If it is assumed that two formations A and B are at an initial temperature $T_0$ and have specific heats $C_A$ and $C_B$, then if an amount of heat Q is supplied to these formations their temperatures may be expressed as:

$$T_A = T_0 + (C_A M_A)^{-1} Q$$
$$T_B = T_0 + (C_B M_B)^{-1} Q \tag{3}$$

In Equations (3) $M_A$ and $M_B$ are the masses of the heated regions. When the heat source is removed from these formations, the temperature of the heated portions will begin to decay back toward the ambient or steady state temperature according to Equation (2). This produces Equations (7) and (8) for the temperature decay of formations A and B.

$$\Delta q_A/\Delta t \approx (K_A [T_0 + (C_A M_A)^{-1} Q - T_0]/X_A) \quad (4)$$

$$\Delta q_B/\Delta t \approx (K_B [T_0 + (C_B M_B)^{-1} Q - T_0]/X_B \quad (5)$$

If we make use of Equation (1) (given below as Equations (6))

$$\Delta q_A \approx C_A M_A \cdot \Delta T_A$$
$$\Delta q_B \approx C_B M_B \cdot \Delta T_B \quad (6)$$

then the change in temperature in a short time interval $\Delta t$ is given by Equation (7) for formation A:

$$T_A = \alpha K_A (C_A M_A)^{-1} Q/\Delta X_A \cdot 1/C_A M_A \cdot \Delta t = K_A \alpha Q/\Delta X_A (C_A M_A)^2 \cdot \Delta t \quad (7)$$

Similarly, an expression for the change in temperature in a short time interval $\Delta t$ for formation B is given by Equation (8):

$$\Delta T_B = \alpha K_B Q/\Delta X_B (C_B M_B)^2 \cdot \Delta t \quad (8)$$

and since the geometrical factor $\alpha$, the differential length $\Delta X$, and the formation masses may for the purposes of the present invention be assumed to vary only slightly for particular depth levels, we may write expressions (9) and (10) for the change in temperature $\Delta T$ over the same time interval $\Delta t$ for both formations A and B:

$$\Delta T_A = N \cdot K_A/C_A^2 \text{ or } \Delta T_A \sim K_A/C_A^2 \quad (9)$$

$$\Delta T_B = N \cdot K_B/C_B^2 \text{ or } \Delta T_B \sim K_B/C_B^2 \quad (10)$$

where $N = \Delta Q \Delta t / \Delta X \quad (11)$

Since a constant output heat source is contemplated for use in the present invention, it may then be stated that if two similarly heated earth formations in the vicinity of the borehole have different thermal conductivities and specific heats and the same amount of heat Q is applied to these formations for the same time interval, they will cool down at different rates, which are directly proportional to the thermal conductivity, K, of these formations, and inversely proportional to their specific heats. The proportionally constant N given by Equation (11) may be determined by calibration of the well logging tool in a borehole having known geometry prior to the well loggging run of the tool in an actual well. Once the calibration constant N of Equation (11) is known for a particular well logging tool in a well borehole having known characteristics then in order to measure $K/C^2$ of any earth formation, which be different for hydrocarbon and water bearing formations, it will only be necessary to measure the rate of decay of temperature after the application of a constant output heat source for a given time in order to determine this physical parameter of the earth formations. By similar arguments, if formations of interest are heated such that each is elevated to the same temperature, then the rate of thermal decay will be proportional to K/C, which is also different for oil and water saturated formations. (The rate of the initial temperature increase is also proportional to K/C, as seen from Equations (1) and (2).)

If the specific heats of these formations vary significantly less than the thermal conductivity, then the rate of temperature decrease (or increase during heating) will be proportional to the thermal conductivity K.

Therefore, the measurement of the thermal conductivity (possibly in combination with specific heat) in earth formations in the vicinity of a well bore may be used to distinguish oil saturated or natural gas saturated sands from fresh water or salt water saturated sand or limestones.

It will be noted from Table II that there is also a variation in the thermal conductivity of earth formations, notably sands, due to the difference in porosity of these materials. If an accurate value of the earth formation porosity is known from a secondary source (such as cores taken while drilling or porosity measurements made with another well logging tool), it is therefore possible by means of the thermal conductivity (possibly combined with specific heat) measurement of the present invention to determine the fluid saturation and type of fluid in the pore spaces of the earth formations in the vicinity of a borehole.

Referring now to FIG. 1, apparatus is illustrated schematically for performing a thermal conductivity log of earth formations surrounding a well borehole. A borehole 2 penetrating earth formations 3, is lined with a steel casing 4 which may be cemented in place or remain uncemented over sections of the borehole. A fluid tight well logging sonde 7 is urged against a side wall of the casing 4 by a wall engaging bow spring 10 of conventional design.

The well logging sonde 7 contains a heating coil 11 which is heated by passing electrical current therethrough from a power supply 12 situated at the earth's surface and which supplied electrical current along the well logging cable 15. The well logging cable 15 may comprise conventional armored multiconductor well logging cable as known in the art or can comprise an armored coaxial well logging cable having a single center conductor surrounded by an insulating layer and a metallic shield layer. Overlying this is another insulating layer and then two outside spiral wrapped armor layers.

The heating coil 11 is operated in such a manner as to provide a constant output of heat which may be transmitted by conduction and convection through the casing into the earth formation materials 3 surrounding the borehole. The body of the fluid tight sonde 7 is constructed of a thermally insulating material such as fiber glass or the like to prevent heat passage therethrough. Situated at the opposite end of the well logging sonde 7 is a temperature sensitive transducer 13. The temperature sensitive transducer 13 may comprise a thermally sensitive resistor (or thermistor) which is connected as one leg of a balanced bridge circuit, if desired. Thus changes in temperature will cause resistance variations which unbalance the bridge circuit and produce an output voltage proportional to the change in temperature of the thermistor. This technique is well known in the art for the accurate measurement of borehole temperature. Other known temperature sensitive transducers could be utilized for this purpose if desired. For example, an alternative transducer 13 could comprise a high frequency oscillator whose frequency of oscillation is determined by a resistive element which is temperature sensitive (such as a thermistor). Alternatively, sensitive thermocouple type heat sensitive transducers may be used as the transducer 13 if desired.

In any event an output voltage level which is indicative of the temperature in its vicinity is produced by the use of the bridge thermistor type transducer 13. This voltage signal is amplified by an amplifier stage 14 and transmitted to the surface via the well logging cable 15. The interior portion of the sonde 7 between the constant output heating element 11 and the temperature sensitive transducer 13 is filled with a thermal insulating material 16 in order to prevent conduction of heat therein from the heat source 11 to the transducer.

In operation the apparatus of FIG. 1 is used as follows. The well logging sonde 7 is lowered to the lowest formation interval whose thermal conductivity K is to be measured (such as formation 17 of FIG. 1). When the upper portion of the sonde containing the constant output heater 11 is positioned adjacent the formation 17 electrical current is supplied to the heating element either for a predetermined interval of time in order to transmit a predetermined quantity of heat Q from the sonde into the formation, or for a time such that each measured formation is heated to temperature T. When this has occurred the electrical current being supplied to heater coil 11 is turned off and the sonde is moved upwardly in the borehole a distance (known from the length of the sonde) sufficient to place the temperature sensitive transducer 13 in the same position opposite the formation to be measured 17. The decay of the temperature measured by the transducer 13 over a predetermined length of time (for example one or two minutes) is transmitted to the surface via well logging cable 15 and supplied to the K, K/C, or $K/C^2$ computer 18.

This computer 18 may comprise a small general purpose digital computer such as the PDP 11 computer as furnished by the Digital Equipment Corporation of Cambridge, Massachusetts. Such a small general purpose computer may be provided with analog to digital converter means for converting the analog temperature voltage measurements to digital form. Also the computer 18 may be programmed by one of ordinary skill in the art in a well known computer language such as FORTRAN to perform the computation of Equations (7) or (8) when supplied with the calibration constant N for a particular well logging sonde.

The borehole temperature when the heat sensitive transducer 13 is initially placed adjacent the formation 17 after heating is stored in the memory of the computer 18. The final borehole temperature after the predetermined length of thermal cooling time has elapsed is also stored in the memory of the computer 18. The computer 18 may be furnished with the calibration constant N of the Equation (11) for a particular well logging sonde and the calculations of Equations (7) or (8) performed by the computer in order to compute the thermal conductivity K (or K/C or $K/C^2$) of the earth formation 17. This completes a measuring cycle at a particular borehole depth.

The well logging sonde 7 is then moved upwardly in the borehole until it is adjacent the next formation whose thermal conductivity K and/or specific heat is desired to be measured and the entire process repeated. The thermal conductivity related measurements may be plotted by a recorder 19 which is supplied with calculated K, K/C, or $K/C^2$ values by the general purpose digital computer 18 and whose record medium 20 is driven as a function of borehole depth by electrical or mechanical connection to the sheave wheel 21 over which the well logging cable passes in a conventional manner. This movement of the record medium 20 as a function of borehole depth is indicated by the dotted line 22 of FIG. 1.

Figure 2:
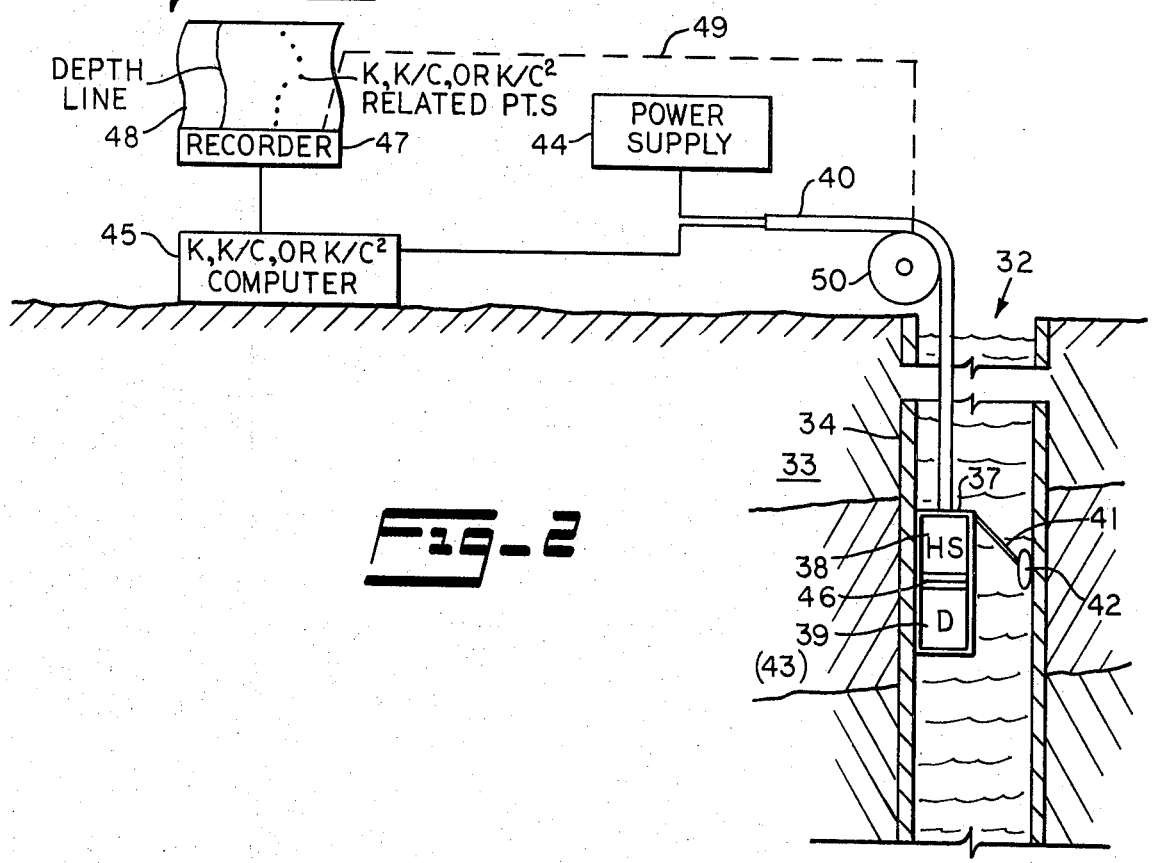
FIG. 2 is a schematic diagram illustrating a second embodiment according to concepts of the present invention utilized for determining the thermal conductivity and/or specific heat of earth formations in the vicinity of the borehole.

Referring now to FIG. 2 an alternative method in accordance with the concepts of the present invention is shown schematically for measuring the thermal conductivity (or K/C or $K/C^2$) of earth formations in the vicinity of a cased or uncased well borehole. In FIG. 2 a well borehole 32 is shown penetrating earth formations 33 and which is lined with a steel casing 34 in a conventional manner. A well logging sonde 37 containing a heat source 38 and a heat sensitive detector 39 disposed immediately adjacent the heat source 38, is suspended in the borehole 32 by means of a conventional armored well logging cable 40 as known in the art. The well logging sonde 37 is urged against one wall of the borehole by a backup arm 41 having a wall engaging pad member 42. In this instance the well logging sonde 37 is deployed adjacent an earth formation 43 whose thermal conductivity is to be measured. Power for the operation of the heat source 38 and the temperature sensitive detector 39 is supplied via conductors of the well logging cable 40 from a surface power supply 44.

In the embodiment shown in FIG. 2 when the well logging sonde 37 is positioned adjacent the formation 43 an initial temperature measurement from the heat sensitive transducer 39 is transmitted via cable 40 to the thermal conductivity computer 45 which may be similar to the computer 18 of FIG. 1. This initial temperature measurement is retained in the memory of the computer 45.

It should be noted also that the body member of the sonde 37 is preferably constructed of an insulating material such as fiber glass or the like to prevent transmission of heat from the heat source 38 to the temperature sensitive transducer 39. Further, the heat source 38 is separated from the temperature sensitive transducer 39 by a layer of efficient insulating material 46 (such as fiberglass or the like) to prevent direct heating of the temperature sensitive element by the heat source 38.

In the embodiment shown in FIG. 2 the heat source 38 and temperature sensitive transducer 39 deployed closely adjacent one another so that they effectively heat and measure the temperature the same portion of the earth formation 43 which is to be measured. In this technique when the initial temperature of the formation has been detected by the heat sensitive detector 39, the heat source 38 is supplied with power and heating of the formation 43 occurs for a predetermined interval of time $\Delta t$ (such as one or two minutes). The temperature change of the formation is constantly monitored during this heating operation by the temperature sensitive transducer 39 and signals representative of its temperature are transmitted to the computer 45 via the well logging cable 40. At the end of this predetermined time interval $\Delta t$ the computation of Equations (7) or (8) is performed by the computer 45 and an output signal proportional to the thermal conductivity K (or K/C) of the earth formation 43 is provided to a recorder 47 having a record medium 48 which is driven as a function of borehole depth (as indicated by the dotted line 49) be either an electrical or mechanical linkage arrangement with a sheave wheel 50 in a manner similar to the linkage of FIG. 1.

After a sufficient sampling time has elapsed and the temperature of the formation 43 during and after heating has been determined, the well logging sonde 37 is moved upward in the borehole and placed adjacent any other additional formations whose thermal conductivity and/or specific heat are to be measured.

In this manner two methods of making stationary measurements of the thermal conductivity possibly together with specific heat of earth formations adjacent a well borehole are provided. If the porosity of the earth formations is known beforehand, then the fluid saturation or content and type of fluid saturating the formations may be determined in the manner previously described with respect to Tables I and II. This technique of stationary measurements can thus be very helpful in distinguishing oil and fresh water saturated sands where other logging techniques may be of no avail.

The foregoing description may make other alternative embodiments of the invention apparent to those skilled in the art. It is therefore the aim in the appended claims to cover all such changes and modifications as fall within the true spirit and scope of the invention.

I claim:

1. A method for thermally logging a well borehole to obtain indications of a quantity functionally related to the thermal conductivity of earth formations in the vicinity of the borehole, comprising the steps of:

positioning a well logging sonde having a source of thermal energy and a longitudinally spaced therefrom temperature sensitive transducer in position adjacent a formation whose thermal properties are to be obtained so that said source of thermal energy defines the position of a measurement station;

activating said source of thermal energy for a predetermined length of time to impart a quantity of thermal energy into said formation sufficient to increase the temperature thereof at said measurement station to a value elevated above that of its ambient borehole condition;

deactivating said source of thermal energy and moving said well logging sonde to position said temperature sensitive transducer at said measurement station;

measuring the temperature of the earth formations at said measurement station at two points in time separated by an amount sufficient to allow a decrease in temperature of said earth formations; and combining said two time spaced temperature measurements according to a predetermined relationship to derive an indication of a quantity functionally related to the thermal conductivity of the earth formations at said measurement station.

2. The method of claim 1 wherein said combining step is performed according to the relationship $$\Delta T = N \cdot K/C^2$$

where $\Delta T$ is the temperature decrease measured at said two separated time points, K is the earth formation thermal conductivity, C is the specific heat of the formation, and N is a predetermined calibration constant characteristic of the well logging sonde and the borehole geometry.

3. The method of claim 1 wherein said source of thermal energy is located longitudinally spaced above said temperature sensitive transducer and said sonde is moved upwardly in the borehole subsequent to the step of activating said source of thermal energy and all of the steps of the measurements are repeated at a plurality of selected borehole depth levels and the results recorded to provide a log of station measurements of said quantity functionally related to thermal conductivity as a function of borehole depth.

* * * * *

UNITED STATES PATENT OFFICE
CERTIFICATE OF CORRECTION

PATENT NO. : 3,864,969
DATED : February 11, 1975
INVENTOR(S) : Harry D. Smith, Jr.

It is certified that error appears in the above-identified patent and that said Letters Patent are hereby corrected as shown below:

Column 1, line 41, the word "More" should be --Most--.

Column 4, lines 40-42, the formulas (3) should be:

$$T_A = T_0 + (C_A M_A)^{-1} Q$$
$$T_B = T_0 + (C_B M_B)^{-1} Q \qquad (3)$$

Signed and sealed this 20th day of May 1975.

(SEAL)
Attest:

RUTH C. MASON
Attesting Officer

C. MARSHALL DANN
Commissioner of Patents
and Trademarks